(12) United States Patent
Owens, Jr.

(10) Patent No.: US 12,304,384 B2
(45) Date of Patent: May 20, 2025

(54) OBDII TRAILER TOWING WIRELESS LIGHT KIT

(71) Applicant: Ernest Everett Owens, Jr., federal heights, CO (US)

(72) Inventor: Ernest Everett Owens, Jr., federal heights, CO (US)

( * ) Notice: Subject to any disclaimer, the term of this patent is extended or adjusted under 35 U.S.C. 154(b) by 0 days.

(21) Appl. No.: 18/234,323

(22) Filed: Aug. 15, 2023

(65) Prior Publication Data

US 2025/0058703 A1    Feb. 20, 2025

(51) Int. Cl.
*B60Q 1/30*      (2006.01)
*B60Q 1/34*      (2006.01)
*B60Q 1/44*      (2006.01)
*B60D 1/64*      (2006.01)

(52) U.S. Cl.
CPC .............. *B60Q 1/305* (2013.01); *B60D 1/64* (2013.01); *B60Q 1/34* (2013.01); *B60Q 1/44* (2013.01); *B60Q 2900/30* (2013.01)

(58) Field of Classification Search
None
See application file for complete search history.

(56) References Cited

U.S. PATENT DOCUMENTS

2023/0312029 A1*   10/2023   Layfield ................. B60D 1/015
                                                                  180/6.5

* cited by examiner

*Primary Examiner* — Ashok Patel

(57) ABSTRACT

A device which allows the user to tow a trailer wirelessly by, plugging a radio frequency transmitter into the vehicle and by plugging a radio frequency receiver into the towed trailer, for brake lights, tail lights and turn signals.

1 Claim, 6 Drawing Sheets

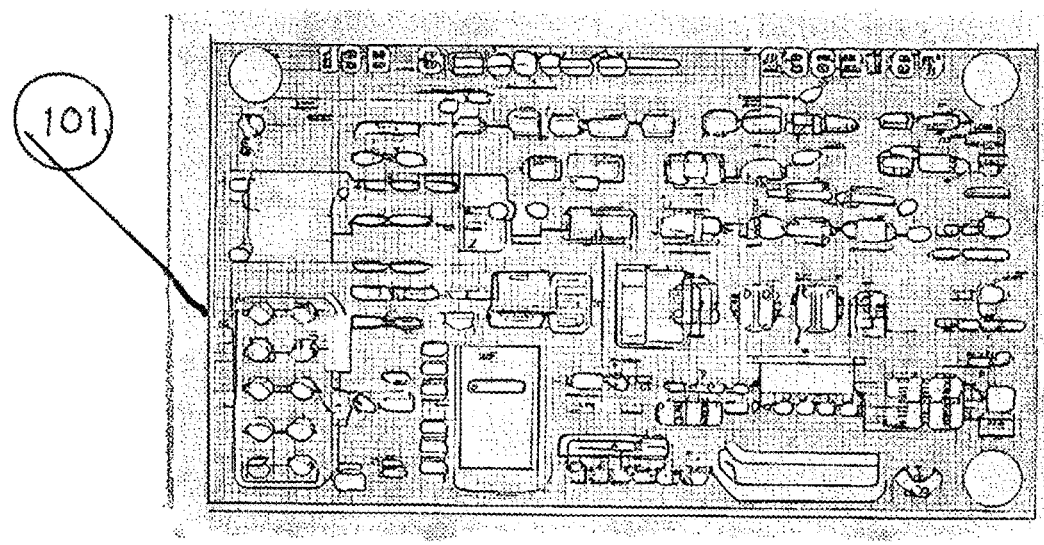
"Fig 1A"
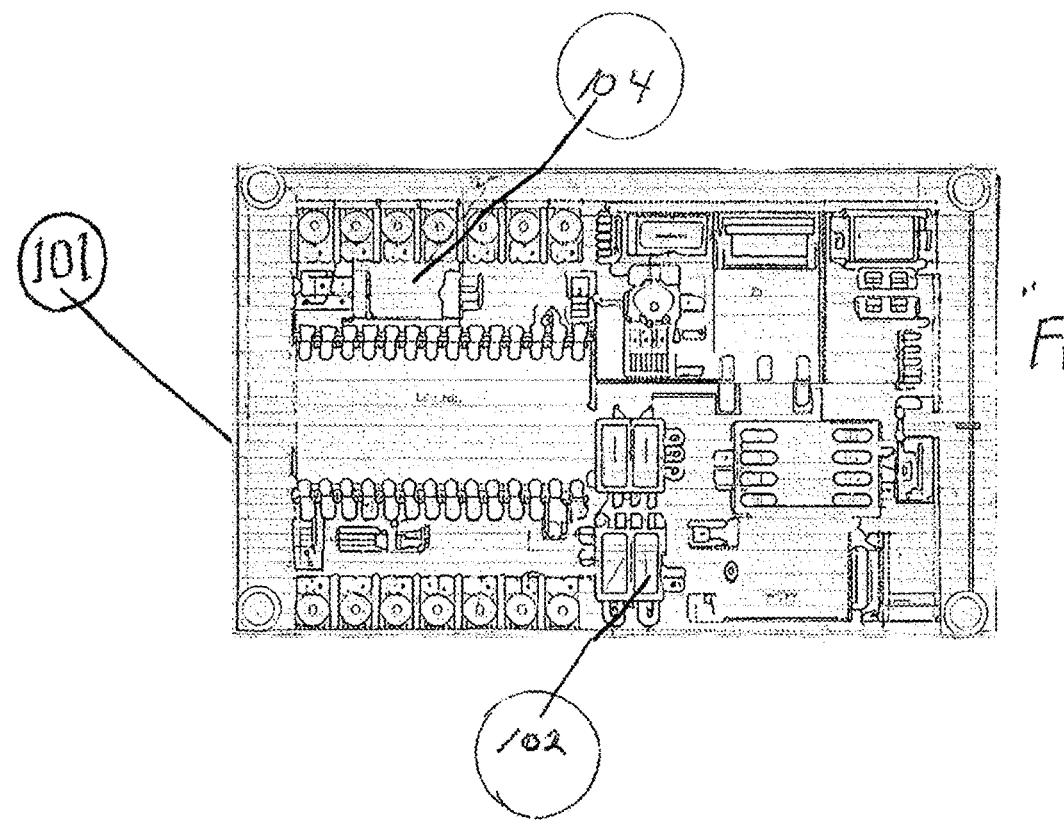
"Fig 1B"

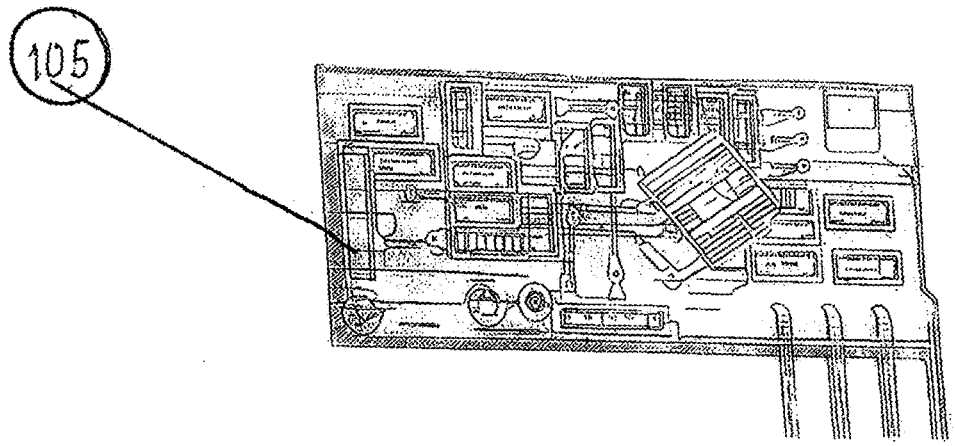
"Fig 4A"
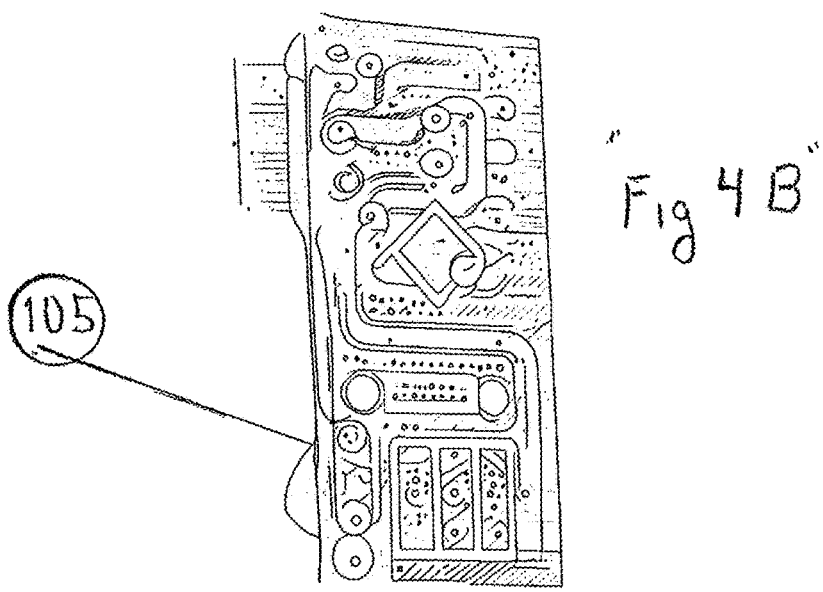
"Fig 4B"

OBDII TRAILER TOWING WIRELESS LIGHT KIT

FIELD

The present application relates to a device that allows the user to Tow a trailer with wireless attachments for trailer lights. Particularly Brake lights, tail lights, and turn signals.

BACKGROUND

The Trailer Towing Industry for years and to this very day are cutting into wire harnesses of automobiles for the purpose of achieving light signals for towed trailers. The recent trend of new electric Cars has aggravated this wire splicing problem.

SUMMARY

By providing a device that allows light signals to be sent to a Towed Trailer wirelessly as described by the embodiments will stop splicing of automobiles wiring harnesses and stop dragging trailer cords.

This disclosed exemplary embodiment provides a device to send light signals directly to a Towed Trailer for lights wirelessly. Further objects, features advantages and properties of device according to the present application will become apparent from the detailed descriptions. It should be noted that although only a Code Reader/Sender/Receiver is described the teachings of this application can also be used on Trailers with electric brakes. Although the invention has been understood many other possible modifications and variations can be made without departing from the spirit and scope of this invention as hereinafter claimed.

DESCRIPTION OF DRAWINGS

In the following detailed portion of the present application will be explained in more detail with reference to the example embodiments shown in the drawings in which:

FIG. 1A shows a view of a device according to a first embodiment.

FIG. 1B shows a bottom view of a device according to a first embodiment.

FIG. 4A is a view of a device according to a fourth embodiment.

FIG. 4B is a bottom view of a device according to a fourth embodiment.

DETAILED DESCRIPTION

Figure 2A:
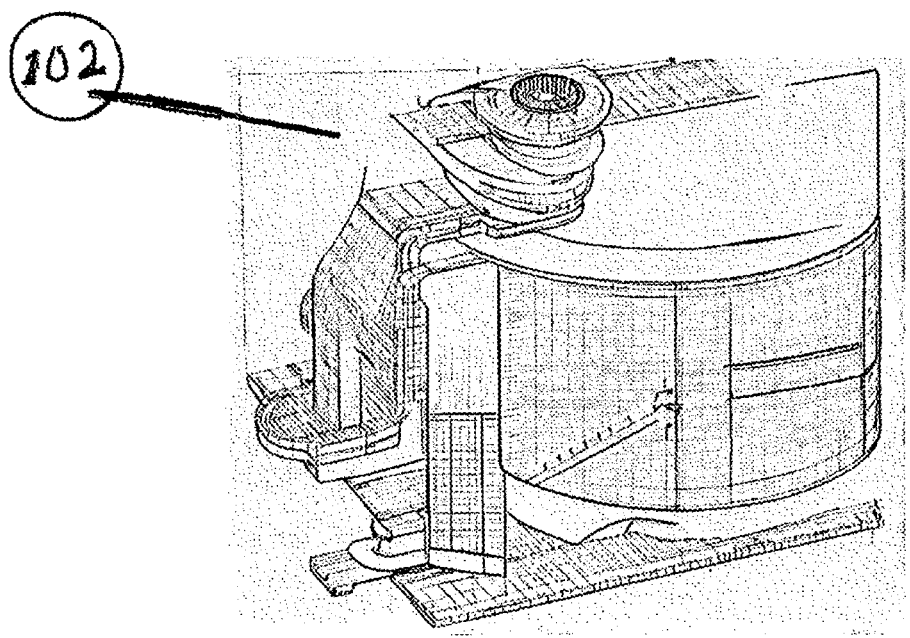
FIG. 2A is a view of a device according to a second embodiment.

In the following detailed description, the Device according to the teachings for this Application in the form of an OBDII Automotive Code Reader/Sender/Receiver shows how this OBDII Reader/Transmitter works.

A first embodiment of the on board diagnostic board is illustrated in FIGS. 1A and 1B. FIG. 1A and FIG. 1B show a view of a device according to the first embodiment a miniature 2.25×1.25 OBD Diagnostic programmable board serial can bus module (101) with interface sixteen pin connector, coded or programmed to receive real time data on brake light, tail light and turn signals from automobiles ODB port FIG. 1A and FIG. 1B.

The Diagnostic Board a blank programmable serial can bus module with interface connector 16 pin Mb rate then coded to read the light signals from the automobiles on board computer, through the on board diagnostic port. A wireless communication module with real time signal data, integrated radio transmitter, modem/32 bit 48 MHz operation continuous frequency coverage from 150 MHz to 840 MHz 12 volts power supply from automobiles OBD port 16 pin 1 Mb rate. The internal components, software and coded protocol structure of the On Board Diagnostic Reader/Sender will not be described in detail since such technology is generally well known. However, the coded board is adapted to the shape of the automobiles On Board Diagnostic Port.

Figure 2B:
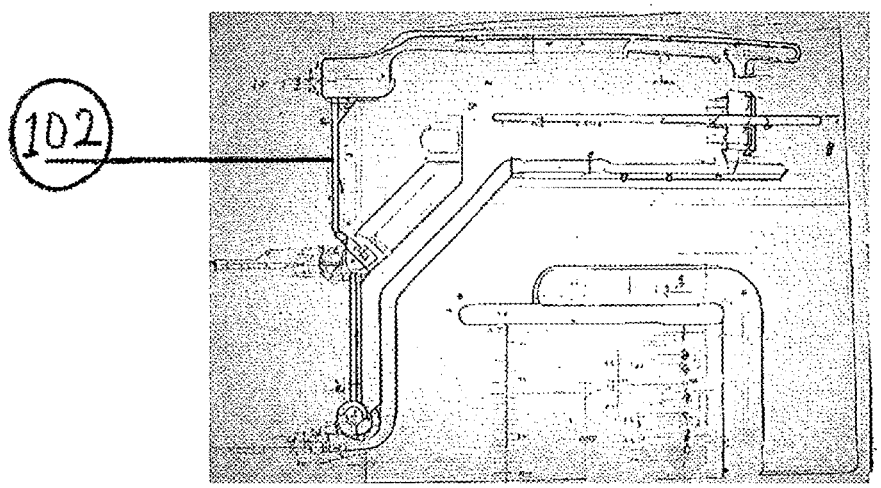
FIG. 2B is a side view of a device according to a second embodiment.

FIG. 2A and FIG. 2B show a view according to a second embodiment. FIG. 2 shows a 0.025×0.025×0.025 miniature 12 volts electromagnetic relay (102) attached to the OBD Diagnostic 2 board of FIG. 1. The electric magnetic relay captures and converts real time data on electrical light signals from the coded OBD Diagnostic board and relays the electrical light signal to a wireless communication module.

A second embodiment of the on board Diagnostic Component is illustrated in FIG. 2A and FIG. 2B. A twelve volts miniature electromagnetic relay captures and converts electrical signals from Diagnostic Board and sends signals to Radio Transmitter Can Bus module with interface connector.

Figure 3A:
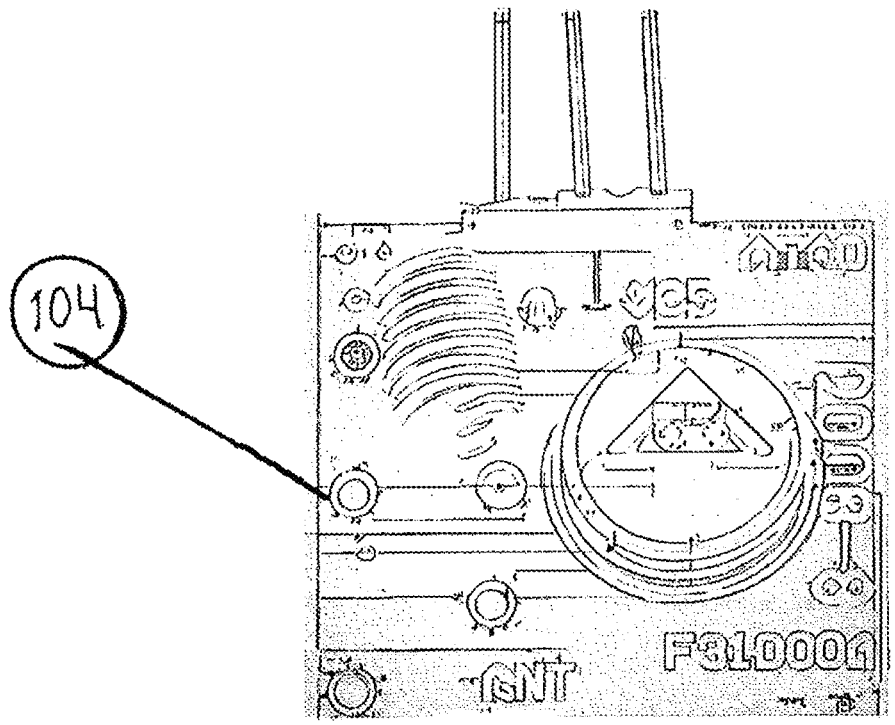
FIG. 3A is a bottom view of a device according to a third embodiment.
Figure 3B:
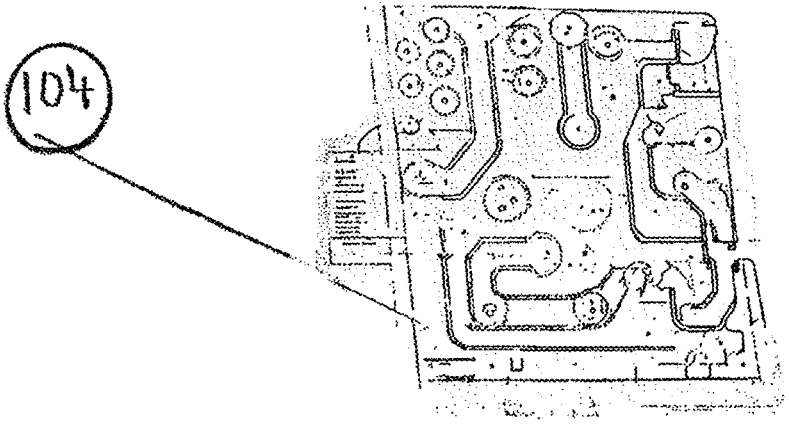
FIG. 3B is a view of a device according to a third embodiment.

FIG. 3A and FIG. 3B show a view of a device according to a third embodiment a miniature 1.50×1.75 RF Radio Transmitter (104). FIG. 3 continuous coverage 48 MHZ 32 bit attached to the OBD Diagnostic board to capture real time signal data from the miniature electromagnetic relay (102) and wirelessly transmits light signals to RF Radio Receiver (105).

A third embodiment of the component is illustrated in FIG. 3A and FIG. 3B. Radio Transmitter sends signals on 48 MHz operating frequency 32 bit continuous coverage from 15 MHz to 840 MHz. Power Supply is from the on board diagnostic port. Light signals are sent to the receiver. The internal Component, software and protocol structure of the radio frequency transmitter technology is generally known.

FIG. 4A and FIG. 4B show a view of a device according to the fourth embodiment a miniature 1.75×3.50 RF radio receiver with continuous coverage and real time signal data 48 MHZ 32 bit receives light signals from transmitter transmitted to the towed trailer wirelessly.

A fourth embodiment of the On Board Diagnostic Receiver is illustrated in FIG. 4A and FIG. 4B. A radio frequency wireless receiver receives light signals for a towed trailer at 48 MHz operating frequency. Power supply from a twelve volts re-chargeable batter pack.

Figure 5A:
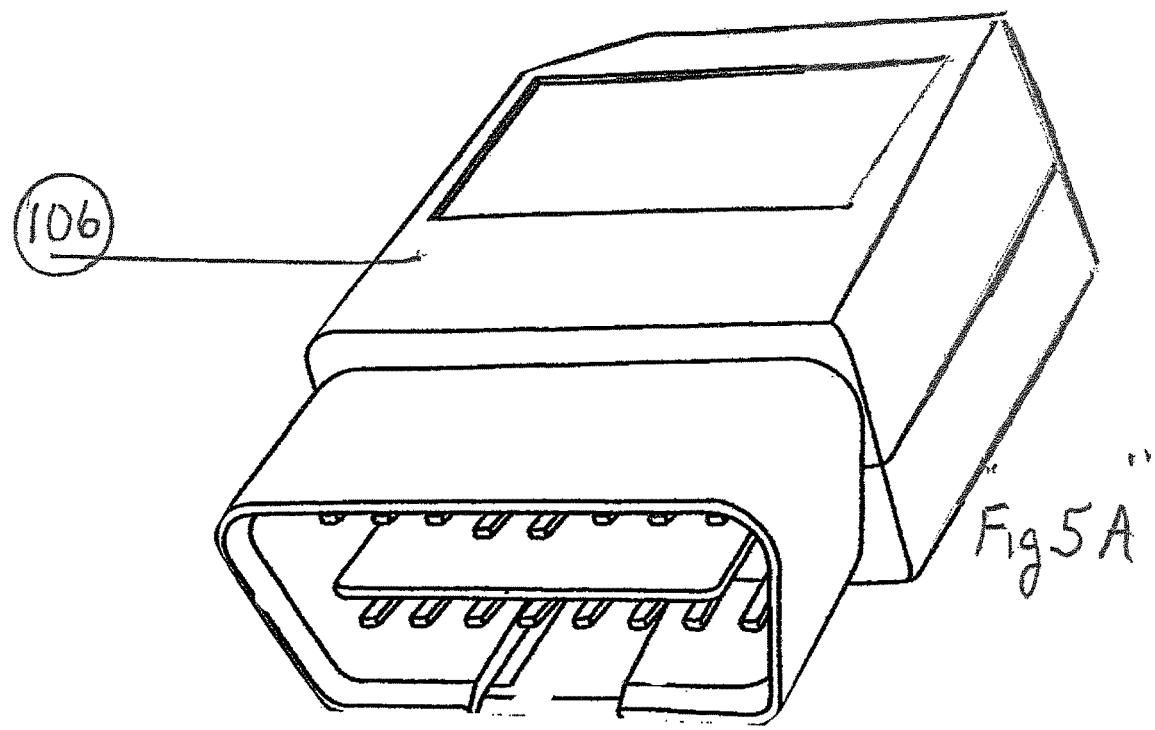
FIG. 5A is a view of where to Insert the new invention.
Figure 5B:
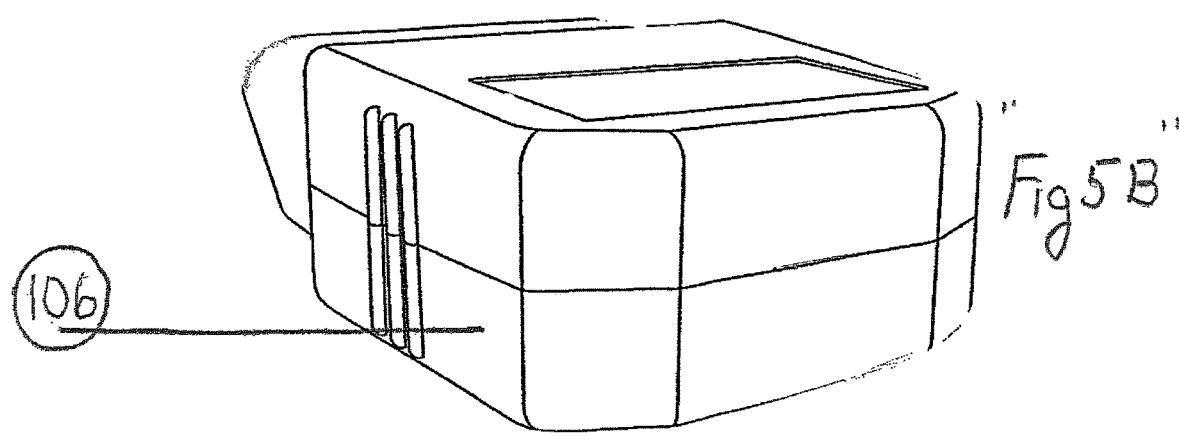
FIG. 5B is a rear view of an RF Senders Plastic Housing.

FIG. 5A and FIG. 5B show a view of a molded 5.75×1.25×3.75 plastic housing (106) that contains molded to fit Automobiles OBD port.

Figure 6A:
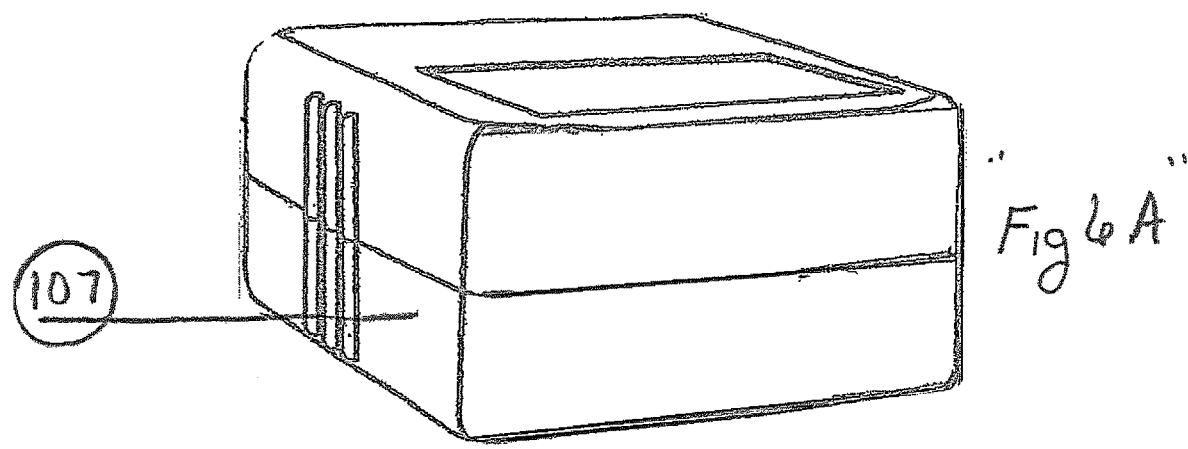
FIG. 6A is a view of an RF Receiver Plastic Housing.
Figure 6B:
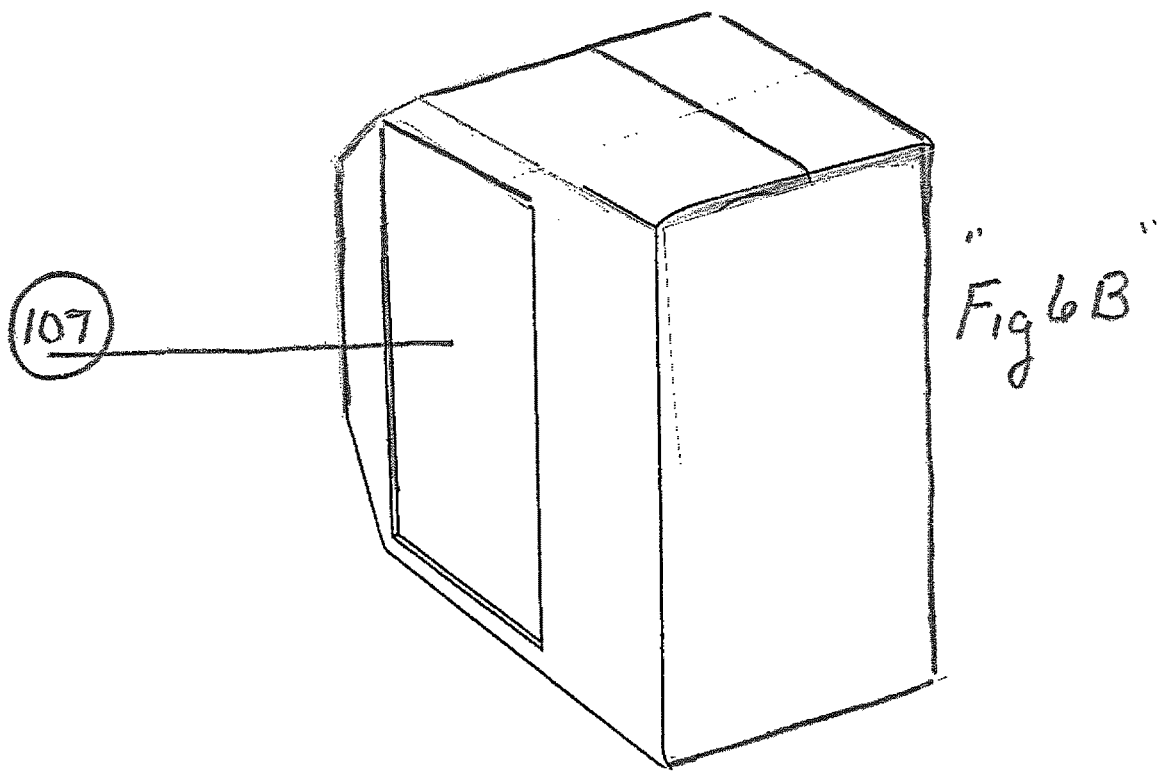
FIG. 6B is a rear view of an RF Receiver Plastic Housing.

FIG. 6A and FIG. 6B show a view of a molded 3.50×2.95×01.25 plastic housing (107) that contains the RF Radio receiver (105) continues coverage 48 MHZ 32 bit real time data that receives light signals from transmitter forwards light signal to towed trailer cord.

The invention claimed is:

1. An OBDII trailer towing wireless light kit comprising a diagnostic module including:
   a miniature 2.25×1.25 sized OBD diagnostic programmable board serial can bus module (101) having sixteen pins interface;
   a miniature 0.025×0.025×0.025 sized twelve volts electromagnetic relay (102) for receiving light signals from the OBD diagnostic programmable serial can buys module (101),
      wherein the OBD diagnostic programmable board serial can bus module (101) is coded or programmed to receive real time data on brake light, tail light and turn signals light from an automobiles OBD port and the electromagnetic relay (102);
   a miniature 1.5×1.75 sized continuous coverage 48 Mhz thirty two bits transmitter (104) attached to the OBD diagnostic board and captures real time signal data then transmit light signals,
      wherein miniature 0.025×0.025×0.025 sized twelve volts electromagnetic relay (102) receives the light signals from the coded miniature OBD diagnostic board and relays corresponding electrical light signals to the radio transmitter (104);
   a miniature 1.75×3.50 sized continuous coverage real time data 48 Mhz 32 bit RF radio receiver (105) for receiving light signals wirelessly,
      wherein the miniature 1.5×1.75 sized continuous coverage 48 Mhz thirty two bits transmitter (104) captures the real time signal data then transmits the light signals wirelessly to the radio receiver (105);
   a 5.75×1.25×3.75 sized molded plastic housing (106) for housing the transmitter (104), the molded plastic housing (106) molded to fit an automobiles OBD port; and
   a 3.50×2.95×01.25 sized molded plastic housing (107) for housing the real time data 48 Mhz 32 bit continuous coverage radio receiver (105).

* * * * *